(12) United States Patent
Williams, Sr.

(10) Patent No.: US 8,387,301 B2
(45) Date of Patent: Mar. 5, 2013

(54) DEER ATTRACTANT

(76) Inventor: James Wayne Williams, Sr., Swan Quarter, NC (US)

( * ) Notice: Subject to any disclaimer, the term of this patent is extended or adjusted under 35 U.S.C. 154(b) by 412 days.

(21) Appl. No.: 12/715,298

(22) Filed: Mar. 1, 2010

(65) Prior Publication Data

US 2010/0218412 A1    Sep. 2, 2010

Related U.S. Application Data

(60) Provisional application No. 61/156,714, filed on Mar. 2, 2009.

(51) Int. Cl.
*A01M 31/06* (2006.01)
(52) U.S. Cl. ............................................................ 43/2
(58) Field of Classification Search ..................... 43/2, 3; 92/34, 84, 134; 446/404; *A01M 31/06*
See application file for complete search history.

(56) References Cited

U.S. PATENT DOCUMENTS

| | | | | |
|---|---|---|---|---|
| 2,909,859 A * | 10/1959 | Christmas | ........................... | 43/3 |
| 5,029,408 A * | 7/1991 | Smith | ................. | 43/1 |
| 5,335,438 A * | 8/1994 | Terrill | ................. | 43/1 |
| 5,826,364 A * | 10/1998 | Bitting | ............. | 43/2 |
| 6,289,626 B1 * | 9/2001 | Williams | ........... | 43/2 |
| 6,532,948 B2 * | 3/2003 | Grichen | ........... | 124/71 |
| 7,441,365 B2 * | 10/2008 | Brunner et al. | ..... | 43/2 |
| 2004/0025400 A1 * | 2/2004 | Salato | ............... | 43/3 |
| 2009/0249678 A1 * | 10/2009 | Arnold | ............. | 43/2 |
| 2009/0307958 A1 * | 12/2009 | McPherson | ....... | 43/3 |

* cited by examiner

*Primary Examiner* — Darren W Ark
*Assistant Examiner* — Lisa Tsang
(74) *Attorney, Agent, or Firm* — Larry E. Severin

(57) ABSTRACT

A deer attractant including: an expandable visual indicator; and a cover adapted to slide over the visual indicator. The device is transitionable between a first state and a second state, so that when the device is in the first state, the cover compresses and encloses the visual indicator, and when the device is in the second state, the visual indicator is expanded and exposed, thereby attracting the animal. The visual indicator is a compressible bellows that urges itself to expand when not compressed by the cover. The device includes a vocal call that produces an audio signal when the device transitions from the first state into the second state.

14 Claims, 4 Drawing Sheets

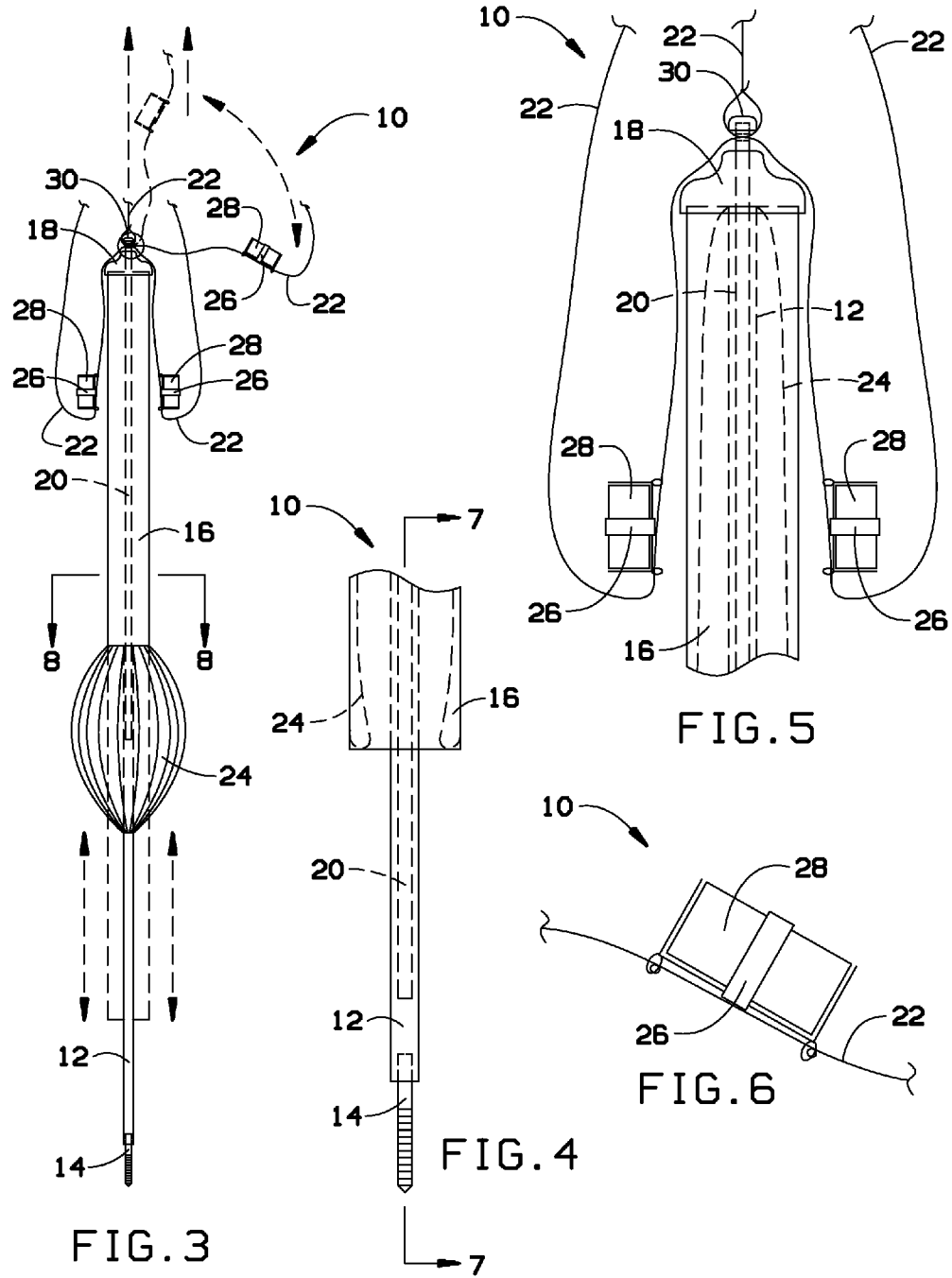

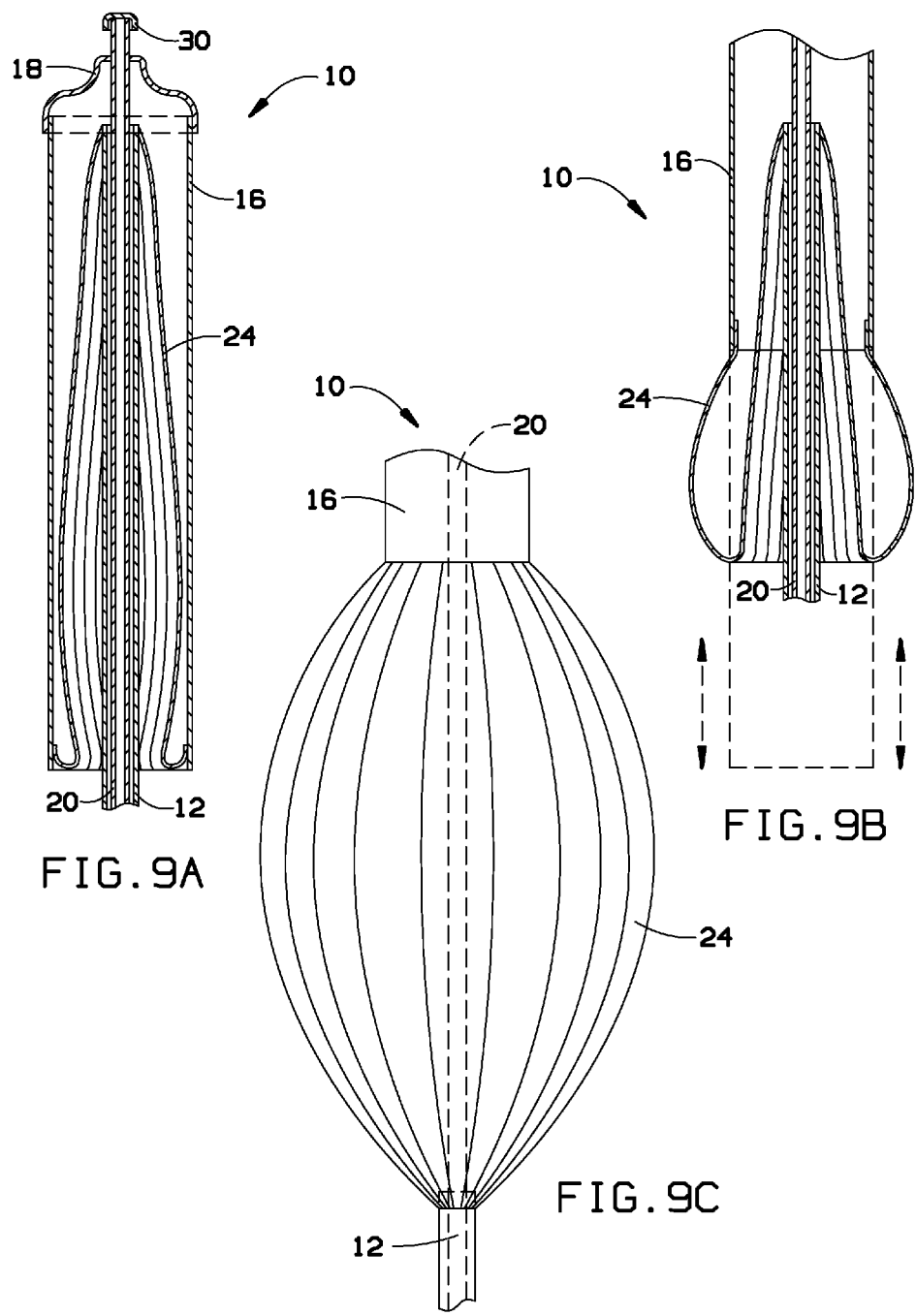

US 8,387,301 B2

DEER ATTRACTANT

RELATED APPLICATIONS

This application claims the benefit of the filing date of U.S. patent application Ser. No. 61/156,714, filed Mar. 2, 2009, which is incorporated herein by reference in its entirety.

BACKGROUND OF THE INVENTION

The present invention generally relates to hunting and more specifically to a deer attractant.

Many products provide attractants such as scents, visual and vocal devices. These devices sometimes work but sometimes a deer will not respond if it does not see another deer where the sound is coming from.

It would be desirable to have a device that provides a visual indicator that could be combined with vocal devices to attract deer.

SUMMARY OF THE INVENTION

In one aspect of the present invention, a device for attracting an animal includes: an expandable visual indicator; and a cover adapted to slide over the visual indicator; wherein the device is transitionable between a first state and a second state, so that when the device is in the first state, the cover compresses and encloses the visual indicator, and when the device is in the second state, the visual indicator is expanded and exposed, thereby attracting the animal.

In another aspect of the present invention, a device includes: an expandable bellows; a visual indicator on the bellows; a first tube adapted to slide over and cover the bellows; and a second tube to support the device, the second tube having a diameter that is smaller than the diameter of the first tube; wherein the first tube slides over the second tube to transition between a closed position and an open position, so that when the first tube is in the closed position, the first tube compresses and encloses the bellows and hides the visual indicator, and when the first tube is in the open position, the bellows is expanded and exposes the visual indicator.

In yet another aspect of the present invention, a method of attracting an animal includes: sliding a cover over a visual indicator to compress and hide the indicator; and sliding the cover away from the visual indicator to release and expose the visual indicator, thereby attracting the animal.

BRIEF DESCRIPTION OF THE DRAWINGS

FIG. 3 is a front view of an embodiment of the embodiment of FIG. 1 as used in the open position;

FIG. 4 is an enlarged detail view of an embodiment of the embodiment of FIG. 1 taken from FIG. 2;

FIG. 5 is an enlarged detail view of an embodiment of the embodiment of FIG. 1 taken from FIG. 2;

FIG. 6 is an enlarged detail view of an embodiment of the embodiment of FIG. 1 taken from FIG. 3;

FIG. 9A is a detail section view of an embodiment of the embodiment of FIG. 1 vertical bellows in the lowered resting position;

FIG. 9B is a detail section view of an embodiment of the embodiment of FIG. 1 vertical bellows in the partially deployed position; and FIG. 9C is a detail view of an embodiment of the embodiment of FIG. 1 vertical bellows in the fully deployed position.

DETAILED DESCRIPTION

Figure 1:
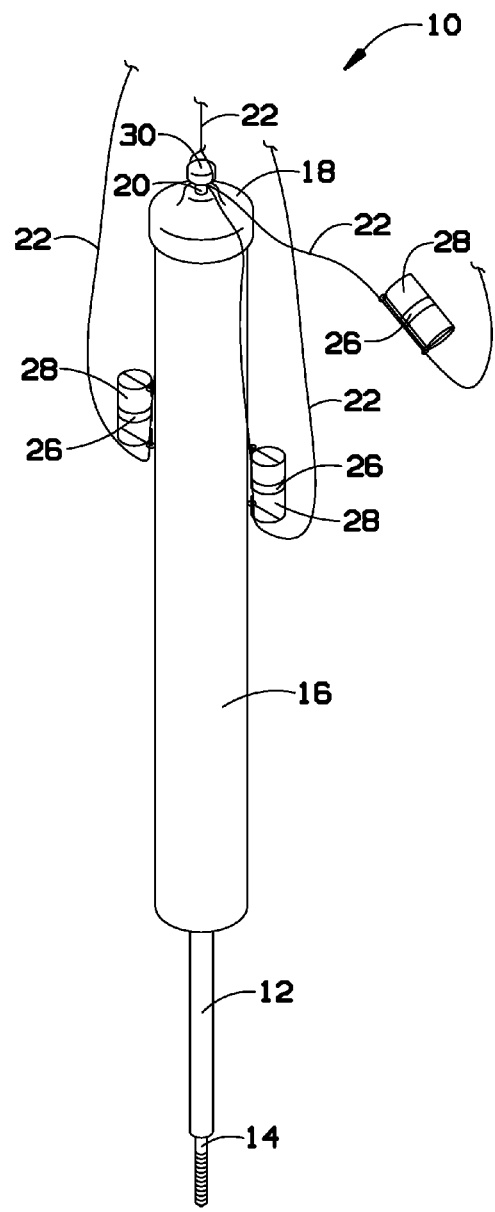
FIG. 1 is a perspective view of an embodiment of the present invention.
Figure 2:
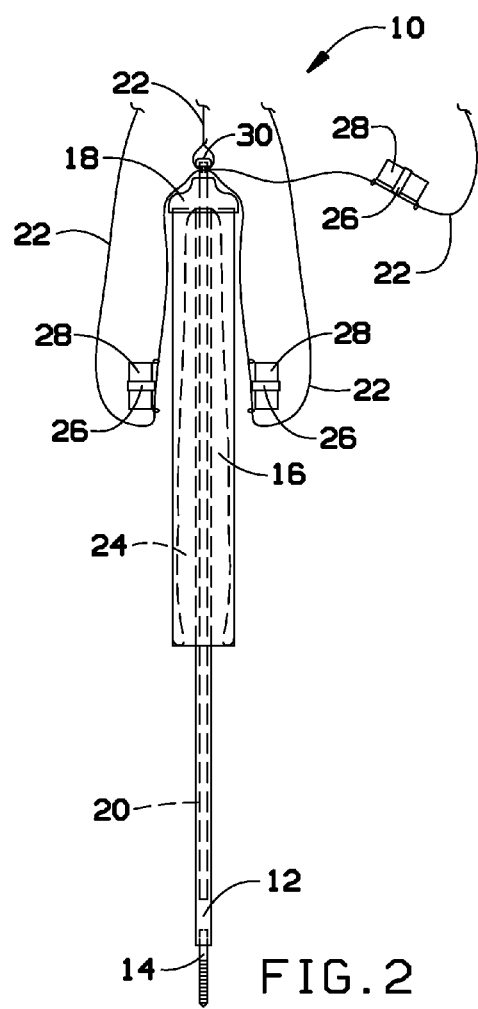
FIG. 2 is a front view of an embodiment of the present invention.
Figures 7, 8:
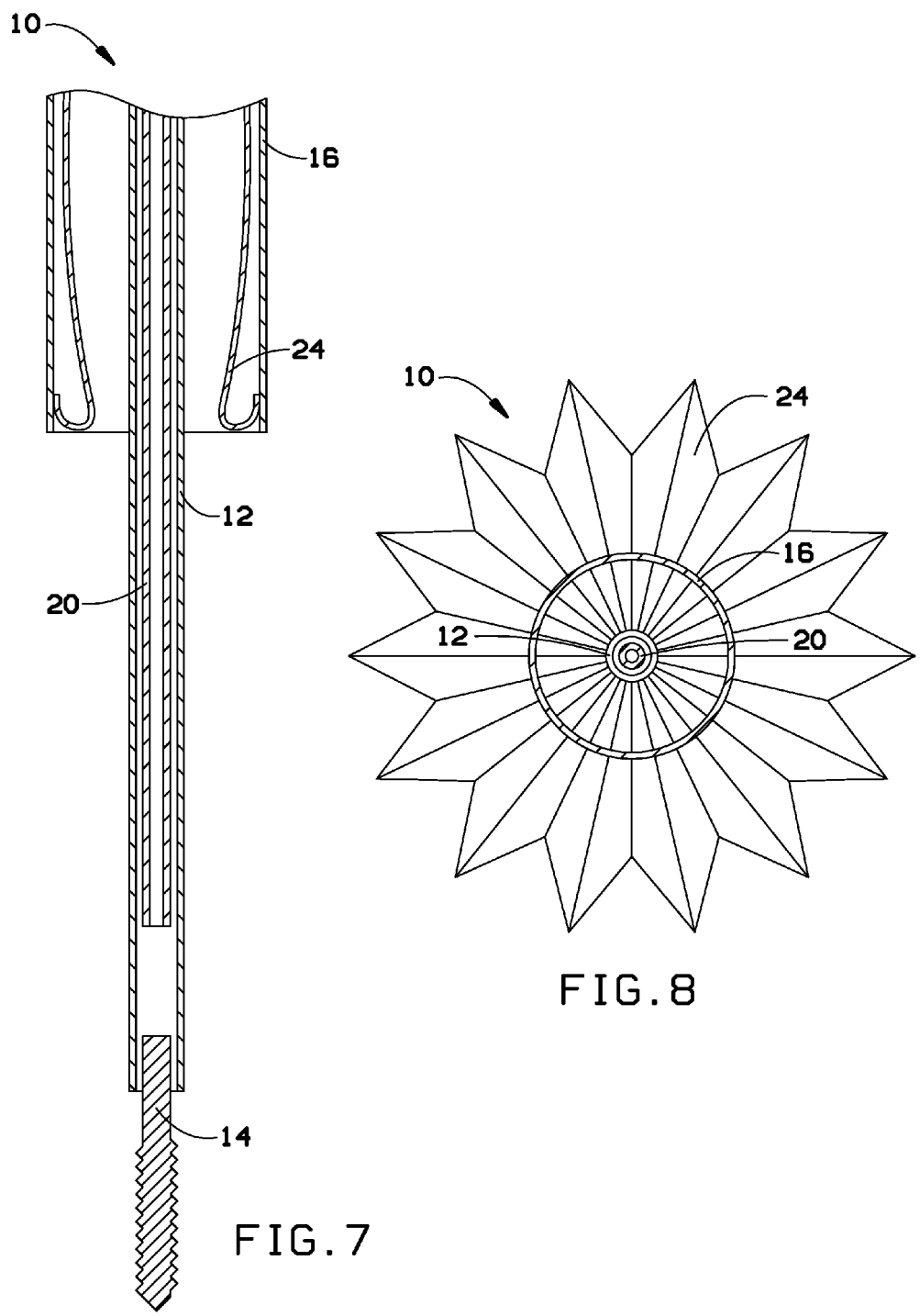
FIG. 7 is a section view of an embodiment of the embodiment of FIG. 1 taken along line 7-7 in FIG. 4.
FIG. 8 is a section view of an embodiment of the embodiment of FIG. 1 taken along line 8-8 in FIG. 3.

The preferred embodiment and other embodiments, including the best mode of carrying out the invention, are hereby described in detail with reference to the drawings. Further embodiments, features and advantages will become apparent from the ensuing description or may be learned without undue experimentation. The figures are not drawn to scale, except where otherwise indicated. The following description of embodiments, even if phrased in terms of "the invention," is not to be taken in a limiting sense, but describes the manner and process of making and using the invention. The coverage of this patent will be described in the claims. The order in which steps are listed in the claims does not indicate that the steps must be performed in that order.

An embodiment of the present invention generally provides a deer attractant. An embodiment may be called "The Flag" and provides a visual attractant which can be used alone or along with other vocal, visual and/or sent attractants.

An embodiment of a device for attracting deer includes a first section of support tubing, a lag bolt attached to bottom of the tubing, a second section of cover tubing, an end cap device to reduce the diameter of the second tubing, attached to the top of the second section, a third slide tubing section attached to the reducing end cap and protruding through the end cap, an end cap which seals to the top of the third section of tubing. A length of cord has one end of tied to the third section through the drilled hole, and a sewn vertical bellows or other visual indicator, with a first opening on the top and a second opening on the bottom, the first opening attached to the bottom of the second section on the inside. The second opening attaches to the top of the first section of tubing. The visual indicator is a "bellows" that urges itself to expand when it is not held compressed.

As depicted in the figures, an embodiment of the invention 10 includes support tubing 12, which may be a tube or hollow shaft approximately 1 in. diameter and approx 4 ft long, with a lag bolt 14 at the end of the support tubing 12. Lag bolt 14 may be approximately 0.5 in. diameter by approx 5 in. long (or similar device) attached to the bottom of support tubing 12 so that the two tubes have the same central axis. A larger cover tubing 16 may be a hollow tube or cylinder approximately 3 in. diameter by 20" that is also aligned on the same central axis. The tubings 12 and 14 may be other shapes or sizes that slide over each other.

At the end of cover tubing 16 is end cap reducer 18, which tapers from 3" to ½" to reduce the diameter of the cover tubing 16. A third slide tubing 20 having a ½" diameter pokes out through end cap reducer 18 at the top of cover tubing 16. The third slide tubing 20 may be 0.5 in. by 40 inches long, and is attached to end cap reducer 18 with approximately 2 in. protruding. A 0.25 in. hole is drilled 1.0 in. from end protruding through end cap reducer 18.

A length of cord 22 or cords may be approximately 0.1 in. by 25 ft. long, more or less. One end of cord 22 is tied to slide tubing 20 through the drilled hole. More than one cord may be attached. Additional cords may be tied to the loop made by the first cord.

A sewn vertical bellows 24, similar to the shape of a football, approximately 18 in. long may be made of a thin slick white material such as garment liner having a 3 in. opening on the top and a 1 in. opening on the bottom. The 3 in. opening is attached to the bottom of larger cover tubing 16 on the inside by glue or mechanical means.

Clips 26 or other means for attaching an audio/vocal game attracting device 28 such as "The Can(R)" or similar device to cords 22 approx 1 ft. from the slide tubing 20 assembly. Clip 26 is a Velcro(R) or other hooks-and-loops strap that will hold game attracting device 28 with eyelets at either end to attach to cords 22. When the cord is relaxed, the vocal attracting device will hang upside down to reset the device. When the cord is pulled upward, the vocal attracting device is turned upright which makes a vocal or audio representation of a female deer. In an embodiment, a cord 22 may be attached to slide tubing 20 assembly without clips 26 to operate the flag, without vocal presentation. Embodiments include a tube end cap 30, which is a weather tight cap to seal the top end of slide tubing 20.

To make an embodiment, the assembly of the larger cover tubing 16, end cap reducer 18, slide tubing 20, and bellows 24 may be inserted onto support tubing 12 by sliding slide tubing 20 into support tubing 12. Bellows 24 is attached to support tubing 12 just below the top of support tubing 12 so that cover tubing 16 will cover the bellows when the assembly is in the down or closed position. With lag bolt 14 screwed into the earth, pulling cords 22 will raise the cover tubing 16, end cap reducer 18 and slide tubing 20, exposing bellows 24 simulating the tail of a deer. All parts except items cords 22 and bellows 24 are painted with camo colors.

In an alternate embodiment, the game attracting device 28 is an accessory which enhances the function of the invention. Embodiments of this invention can also enhance the effectiveness of marketed products. Additional cords 22 provide extra functionality such as multiple game attracting devices 28 for a plurality of tones. Different size game attracting devices 28 may produce different tones.

In an embodiment, support tubing 12 attaches to lag bolt 14 one end and bellows 24 on the other. Cover tubing 16 attaches to end cap reducer 18 one end and bellows 24 on the other. Slide tubing 20 attaches through end cap reducer 18 on end and cords 22 on the same end. Clips 26 attach to cords 22. Tube end cap 30 attaches to the top of slide tubing 20. Support tubing 12 is a vertical shaft which functions as the backbone for the device. A lag bolt 14 in the end provides means for the assembly to be supported in a vertical direction by screwing it into the earth. Cover tubing 16 is a cover for the flag to be hidden when not deployed. End cap reducer 18 is a cap for reducing the large diameter of cover tubing 16 down to match the diameter of slide tubing 20. Slide tubing 20 provides a sliding shaft for cover tubing 16 assembly to move freely up and down. Slide tubing 20 slides inside of support tubing 12. Cords 22 provide a means to remotely operate the assembly from an elevated vertical stand. Bellows 24 is a bright white vertical bellows which is fully exposed when the device is extended and is hidden when the device is retracted. Clips 26 are devices to fasten an existing vocal call to cords 22.

An embodiment of the invention can be made from ordinary hardware parts, or mass produced by commercial means. The shaft parts can be made from PVC, thin metal tubing, or any material suitable for making a relatively stiff tube. The flag can be made from a variety of materials but is preferably slick, to fold inward. The cord can be of almost any material with dark or camo color. Multiple cords made of different colors to help the hunter keep track of each function. The cans are commonly used by hunters and are available at most sports stores.

In an embodiment, a hunter would place the invention under a tree stand or any elevated concealment, attaching it by means of the lag bolt on the bottom in an upright position. Attach one (or multiple) cans to the clips on the cord(s) then attach the cord(s) to a convenient place on the stand. Give a call by lifting the cord approx 1 foot to make the can stand upright. When a deer is spotted, they will typically look to see if they see another deer, lift the cord up to expose the flag for a few seconds. This puts the buck at ease and confirms that he is seeing another deer. A few drops of buck lure around the invention may also improve your chances of a close encounter.

An embodiment of this invention may be used on various species and a silent signal between hunters. An embodiment of the invention has solid white flag part which is visible 360 degrees not just from one direction. An embodiment of the invention has a weather proof cover allowing it to remain on site for the season or permanently if desired. An embodiment of the invention has means for attaching vocal call(s) for enhanced attraction. An embodiment of the invention provides multiple functionally by combining a flag and/or vocal attraction.

I claim:

1. A device for attracting an animal, comprising:
    an expandable visual indicator; and
    a cover adapted to slide over the visual indicator;
    wherein the device is transitionable between a first state and a second state, so that when the device is in the first state, the cover compresses and encloses the visual indicator, and when the device is in the second state, the visual indicator is expanded and exposed, thereby attracting the animal; and
    wherein the visual indicator is a compressible bellows that urges itself to expand when not compressed by the cover.

2. The device of claim 1, wherein the cover is a first tube having a central axis and the visual indicator has a first end and a second end, the device further comprising:
    a second tube, having a smaller diameter than the diameter of the first tube, the second tube having the same central axis as the first tube and attaching to the first end of the visual indicator, so that the first tube slides along the second tube to alternately hide or expose the second end of the visual indicator and transition the device between the first state and the second state.

3. The device of claim 1, further comprising:
    a bolt attached to an end of the device to attach the device to the earth and to retain the device in a generally vertical orientation, so that gravity urges the cover to slide over the visual indicator and urge the device into the first state.

4. The device of claim 1, wherein when the device is in the second state, the visual indicator is exposed so as to be visible from 360 degrees around the device.

5. The device of claim 1, further comprising:
    a cord attached to the cover, the cord adapted to slide the cover from the first state into the second state, thereby exposing the visual indicator.

6. The device of claim 1, further comprising:
    a vocal call that produces an audio signal when the device transitions from the first state into the second state, thereby attracting the animal.

7. The device of claim 1, wherein the cover is colored so as to camouflage the cover from the animal.

8. The device of claim 1, further comprising:
a water tight end cap to prevent rain from entering onto the cover when the device is in the first state.

9. A device for attracting an animal, comprising:
an expandable visual indicator; and
a cover adapted to slide over the visual indicator;
wherein the device is transitionable between a first state and a second state, so that when the device is in the first state, the cover compresses and encloses the visual indicator, and when the device is in the second state, the visual indicator is expanded and exposed, thereby attracting the animal; and
wherein the cover is camouflaged so as not to be visible to a deer and the visual indicator is an expandable bellows having a surface that is colored so as to provide a visual indicator that attracts the deer.

10. A device comprising:
an expandable bellows;
a visual indicator on the bellows;
a first tube adapted to slide over and cover the bellows; and
a second tube to support the device, the second tube having a diameter that is smaller than the diameter of the first tube;
wherein the first tube slides over the second tube to transition between a closed position and an open position, so that when the first tube is in the closed position, the first tube compresses and encloses the bellows and hides the visual indicator, and when the first tube is in the open position, the bellows is expanded and exposes the visual indicator.

11. The device of claim 10, wherein the second tube is attached to a first end of the bellows, so that the first tube slides along the second tube to alternately enclose or expose a second end of the bellows, thereby transitioning the first tube between the closed position and the open position.

12. The device of claim 10, further comprising:
a bolt attached to an end of the second tube that retains the device in a generally upright position, so that gravity helps slide the first tube into the closed position.

13. The device of claim 10, further comprising:
a cord to slide the first tube from the closed position into the open position.

14. The device of claim 10, further comprising:
a vocal call that produces an audio signal when the first tube slides from the closed position into the open position.

\* \* \* \* \*